United States Patent

Borsuk

[11] 4,283,125
[45] Aug. 11, 1981

[54] FIBER OPTIC CONNECTOR

[75] Inventor: Leslie M. Borsuk, Los Alamitos, Calif.

[73] Assignee: International Telephone and Telegraph Corporation, New York, N.Y.

[21] Appl. No.: 53,732

[22] Filed: Jul. 2, 1979

[51] Int. Cl.³ .......................... G02B 5/14; H01R 4/28
[52] U.S. Cl. .................................... 350/96.20; 174/89
[58] Field of Search ............ 350/96.20, 96.21, 96.22; 174/89, 65 SS

[56] References Cited

U.S. PATENT DOCUMENTS

| | | | |
|---|---|---|---|
| 1,246,964 | 11/1917 | Lowe | 174/89 |
| 4,047,797 | 9/1977 | Arnold et al. | |

FOREIGN PATENT DOCUMENTS

| | | | |
|---|---|---|---|
| 1097000 | 1/1961 | Fed. Rep. of Germany | 174/89 |
| 928336 | 6/1963 | United Kingdom | 174/89 |
| 1163167 | 9/1969 | United Kingdom | 174/89 |
| 148828 | 5/1961 | U.S.S.R. | 174/89 |

Primary Examiner—John K. Corbin
Assistant Examiner—Rodney Bovernick
Attorney, Agent, or Firm—Thomas L. Peterson

[57] ABSTRACT

A fiber optic connector is disclosed in which the cable strength member termination comprises inner and outer sleeves surrounding the cable. One of the opposed surfaces of the sleeves is disposed at an angle which opens rearwardly. A clamping ring is disposed between the sleeves. The strength member of the cable is folded back between the angular surface and the clamping ring so that when aa rearward axial load is applied to the cable, the strength member will become more tightly clamped.

5 Claims, 5 Drawing Figures

FIBER OPTIC CONNECTOR

BACKGROUND OF THE INVENTION

The present invention relates generally to a fiber optic connector and, more particularly, to the fiber optic cable strength member termination for such a connector.

It is common practice to terminate the strength members of a fiber optic cable by trapping them between two concentrically fitting press-fit cylinders. The termination is physically accomplished by placing the cable inside the inner cylinder and folding the strength members, typically plastic strands, back over the inner cylinder. The outer cylinder is then press-fit over the inner cylinder to trap the strands. Such a termination arrangement is disclosed in U.S. Pat. No. 4,047,797, to Arnold, et al. A disadvantage of this termination arrangement is when axial rearwardly directed loads are applied to the cable placing the strength member thereof in tension, the strength member moves and tends to pull the two cylinders apart thereby releasing the termination. In order to preclude the release of the two cylinders, it is necessary that the structure of the connector housing in which the termination arrangement is mounted adequately confine the two cylinders such that there can be no relative motion between them. This requirement upon the connector housing complicates the design of the connector and increases its manufacturing cost.

It is the object of the present invention to overcome the attendant disadvantages of the prior art fiber optic cable termination by providing an arrangement which does not require a complicated connector housing construction, yet assures that the termination to the strength member of the fiber optic cable will not release when axial forces are applied to the cable.

SUMMARY OF THE INVENTION

According to the principal aspect of the present invention, there is provided a connector for a fiber optic cable having a strength member and at least one optical fiber therein. The connector comprises a connector body having a front mating end and a rear adapted to have the cable extend therein. A fiber optic cable strength member termination means is provided adjacent to the rear of the connector body. The termination means comprises inner and outer sleeves having opposed surfaces and a clamping ring therebetween. One of the opposed surfaces extends at an angle longitudinally relative to the other surface with the angle opening rearwardly. Thus, when the cable extends through the inner sleeve with its strength member folded back between the angular surface and the clamping ring, a rearwardly directed axial load on the cable will cause the ring to shift forwardly thereby more tightly clamping the strength member, thus avoiding release of the strength member of the cable.

DESCRIPTION OF THE PREFERRED EMBODIMENTS

Figure 1:
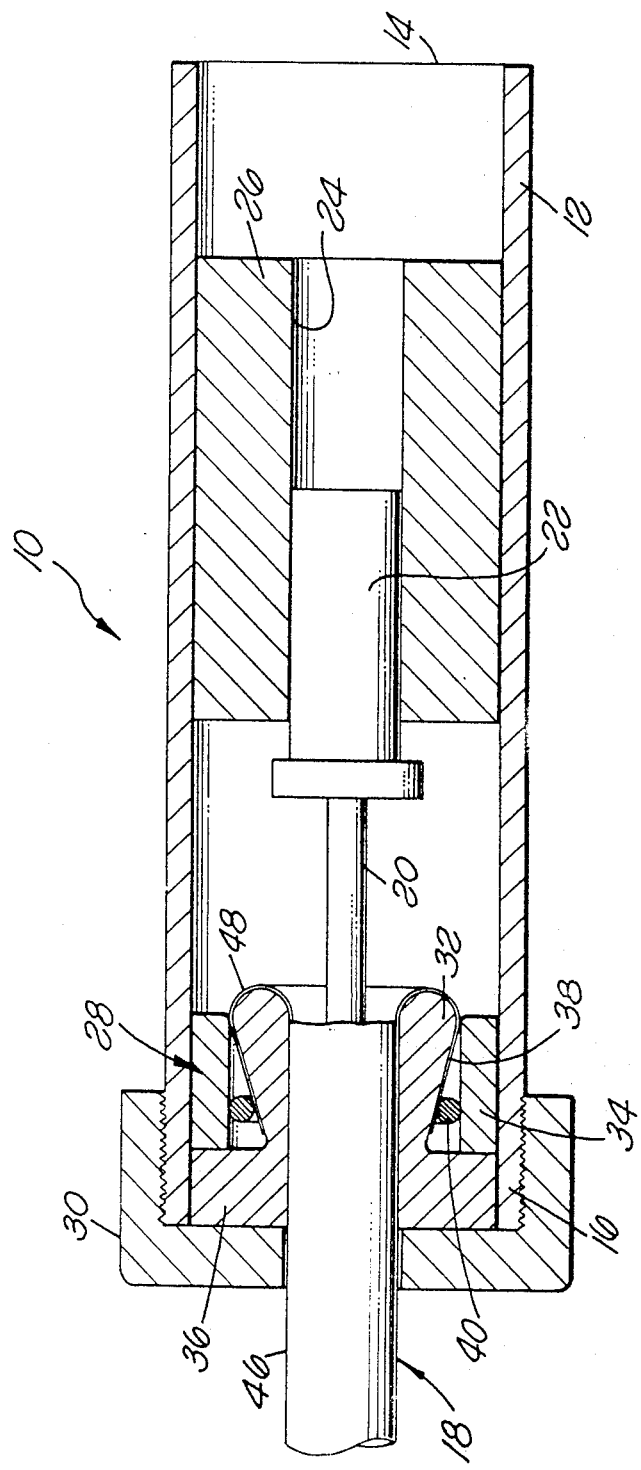
FIG. 1 is a partial longitudinal sectional view through a fiber optic connector employing the novel cable termination of the present invention.
Figure 2:
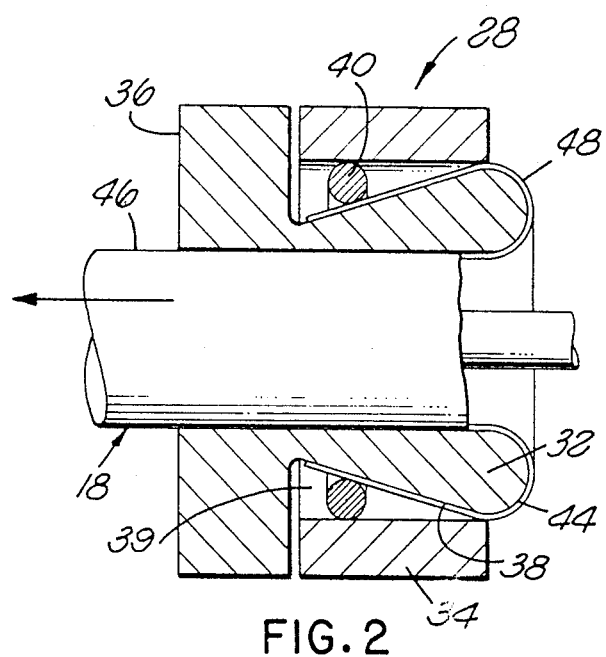
FIG. 2 is an enlarged sectional view of the termination illustrated in FIG. 1.
Figure 3:
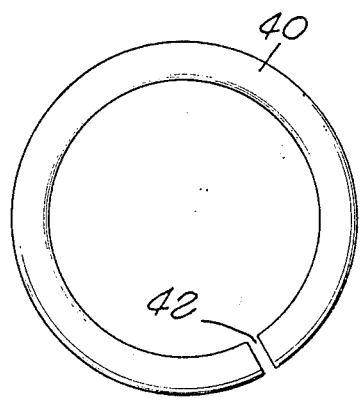
FIG. 3 is an elevational view of the clamping ring utilized in the termination illustrated in FIGS. 1 and 2.

Reference is now made to FIGS. 1 to 3 of the drawing in detail wherein the connector of the present invention is generally designated 10. The connector comprises a cylindrical body or shell 12 having a front mating end 14 and a rear 16. A fiber optic cable 18 extends into the rear of the body 12, and includes an optical fiber 20 connected to a ferrule 22. The ferrule is slidably mounted in a passage 24 extending through a support 26. The forward end of the passage 24 is adapted to receive a second fiber optic ferrule mounted in a mating connector member, not shown, which would couple with the front of the connector 10. Preferably spring means, not shown, bias the ferrule 22 forwardly in the passage 24. The structure of the connector and ferrule described so far may be considered to be conventional, and constitutes no part of the present invention.

the fiber optic cable strength member termination means of the present invention is generally designated 28. Such means is retained in the rear of the connector body 12 by a threaded cap 30. The termination means is best seen in FIGS. 2 and 3, and includes an inner sleeve 32 and an outer cylindrical sleeve 34. The rear of the inner sleeve embodies an outwardly extending annular flange 36 which abuts against the cap 30. The outer surface 38 of the inner sleeve extends at an angle rearwardly and inwardly so that a wedge-shaped cavity 39 is provided between the outer angular surface of the inner sleeve 32 and the inner cylindrical surface of the outer sleeve 34. A clamping ring 40 is mounted in the cavity 39. The ring 40 is preferably formed of spring metal, and is longitudinally slit, as indicated as 42, so that the ring may be expanded to facilitate its mounting over the enlarged forward end 44 of the inner sleeve.

Before the ferrule 22 is coupled to the optical fiber 20 of cable 18, the jacket 46 is removed at the forward end of the cable to expose the strength member of the cable, typically in the form of plastic strands indicated by reference numeral 48. The inner sleeve 32 is slipped over the cable and the strands 48 are folded back over the sleeve against the angular outer surface 38. Preferably the forward end 44 of the inner sleeve 32 is rounded so that the strength member strands will not be damaged when folded over the sleeve. The clamping ring 40 is then expanded and placed over the inner sleeve and then is slid forwardly to trap the strands 48 therebetween. The outer sleeve 34 is then pressed over the resulting assembly. The outer sleeve retains the clamping ring 40 in position to clamp the strength member 48 tightly against the angular surface of the inner sleeve. It will be appreciated that when a rearward axial load is applied to the cable 18, tension will be applied to the strength member 40 of the cable. This tension serves to move the clamping ring 48 forwardly in the wedge-shaped cavity 39 to tighten its grip upon the strength member rather than release it as in the prior art structures. As the ring tends to move forward, radial loads are applied to the outer sleeve rather than longitudinal loads thereby precluding its release from the inner sleeve.

Figure 4:
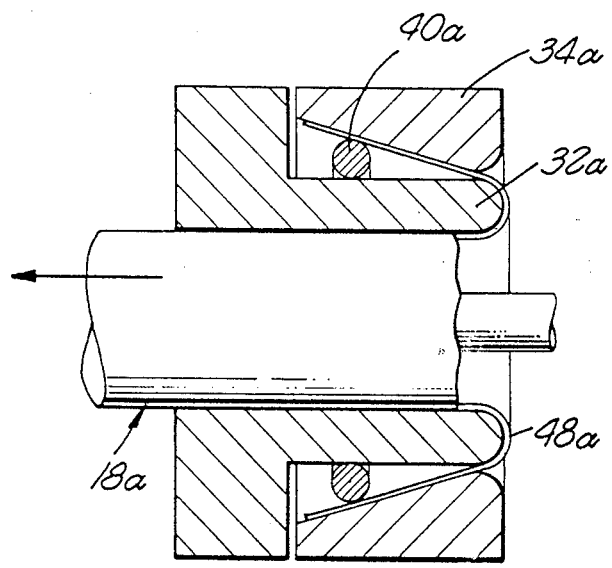
FIG. 4 is an enlarged sectional view similar to FIG. 2 showing a modified form of the termination of the present invention.
Figure 5:
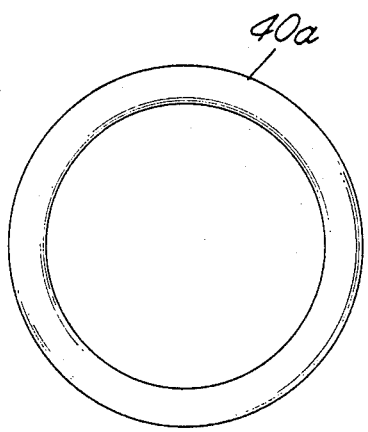
FIG. 5 is an elevational view of the clamping ring utilized in the termination illustrated in FIG. 4.

Reference is now made to FIGS. 4 and 5 of the drawing, which illustrates a second embodiment of the cable termination arrangement of the present invention wherein like reference numerals are utilized to designate like or corresponding parts to those illustrated to FIGS. 1 to 3, with the suffix "a" added. In FIGS. 4 and 5, the outer surface of the inner sleeve 32a is cylindrical, rather than tapered, and the inner surface of the outer sleeve 34a extends at an angle rearwardly and outwardly. In this arrangement, the clamping ring 40a is solid, as seen in FIG. 5, and is simple slipped over the cylindrical inner sleeve 32a. After the ring 40a is placed over the inner ring, the strength member strands 48a of the fiber optic cable 18a are folded back over the clamping ring. Thereafter the outer sleeve 34a is pressed over the assembly to tightly clamp the strands 48a between the ring 40a and the outer sleeve. As in the first embodiment disclosed herein, when a rearward axial load is applied to the cable 18a, tension applied to the strands 48a will cause the clamping ring 40a to more tightly clamp the strands and will apply a radial load on the outer sleeve 34a to preclude its release from the inner sleeve.

Thus, in both embodiments of the invention disclosed herein, it will be appreciated that a relatively simple three piece assembly is provided for terminating to the strength member of a fiber optic cable without requiring complicated connector housing construction to retain the termination arrangement, yet very tight clamping of the strength member of the cable is achieved.

What is claimed is:

1. A connector terminated to a fiber optic cable having a strength member and at least one optical fiber therein comprising:

a connector body having a front mating end and a rear, said cable extending into said rear of said body;

fiber optic cable strength member termination means adjacent said rear of said connector body;

said termination means comprising inner and outer sleeves having opposed, angular and generally cylindrical surfaces and a clamping ring therebetween engaging one of said surfaces;

said angular surface extending at an angle longitudinally relative to said cylindrical surface with said angle opening rearwardly;

said cable extending forwardly through said inner sleeve with its strength member folded back over the forward end of said inner sleeve and extending rearwardly between the other of said surfaces and said clamping ring, whereby a rearwardly directed axial load on said cable will cause said ring to shift forwardly thereby tightly clamping said strength member.

2. A connector for a fiber optic cable as set forth in claim 1 wherein:

said angular surface is formed on the outside of said inner sleeve.

3. A connector for a fiber optic cable as set forth in claim 2 wherein:

said ring is longitudinally slit.

4. A connector for a fiber optic cable as set forth in claim 1 wherein:

said angular surface is formed on the inside of said outer sleeve.

5. A connector for a fiber optic cable is set forth in claim 4 wherein:

said ring is solid.

* * * * *